(12) United States Patent
Pedley et al.

(10) Patent No.: US 7,627,807 B2
(45) Date of Patent: Dec. 1, 2009

(54) MONITORING A DATA PROCESSOR TO DETECT ABNORMAL OPERATION

(75) Inventors: Christopher Pedley, Cambridge (GB); Jonathan Sean Callan, Cambridge (GB); Hedley James Francis, Suffok (GB)

(73) Assignee: ARM Limited, Cambridge (GB)

( * ) Notice: Subject to any disclaimer, the term of this patent is extended or adjusted under 35 U.S.C. 154(b) by 551 days.

(21) Appl. No.: 11/114,236

(22) Filed: Apr. 26, 2005

(65) Prior Publication Data

US 2006/0242517 A1 Oct. 26, 2006

(51) Int. Cl.
*G11B 27/00* (2006.01)
*H04L 7/00* (2006.01)

(52) U.S. Cl. .......................... 714/814; 713/154; 726/4; 726/22

(58) Field of Classification Search ................ 714/814; 726/4, 22; 713/154
See application file for complete search history.

(56) References Cited

U.S. PATENT DOCUMENTS 7,039,947 B1 * 5/2006 Indefrey et al. ................. 726/3
2005/0132217 A1 * 6/2005 Srinivasan et al. .......... 713/200

FOREIGN PATENT DOCUMENTS

| GB | 2 356 271 | 5/2001 |
| JP | 05-210539 | 8/1993 |
| JP | 05-257752 | 10/1993 |
| JP | 06-222960 | 8/1994 |
| JP | 07-036742 | 2/1995 |

* cited by examiner

*Primary Examiner*—Guy J Lamarre
(74) *Attorney, Agent, or Firm*—Nixon & Vanderhye P.C.

(57) ABSTRACT

Monitoring logic 20 for monitoring a data processor 10 to detect if it is not operating as anticipated, the monitoring logic 20 comprising: a timer 27 operable to measure a predetermined time; detection logic 24; and control logic 22; wherein said detection logic is operable to detect a data or instruction access to at least one predetermined address and in response to not detecting said data or instruction access within said predetermined time, said control logic is operable to send a control signal to said data processor, said control signal controlling said data processor to perform a predetermined operation.

16 Claims, 5 Drawing Sheets

MONITORING A DATA PROCESSOR TO DETECT ABNORMAL OPERATION

BACKGROUND OF THE INVENTION

1. Field of the Invention

This invention relates to the field of data processing systems. More particularly, this invention relates to the field of monitoring a data processor to detect if it is operating as anticipated.

2. Description of the Prior Art

In data processing systems, errors may occur that cause the system to stop executing correctly. A known way of detecting such errors and resetting the system is by the use of a watchdog. A watchdog is generally a piece of hardware that is built into a microcontroller and can cause a processor to reset if it judges that it has hung for some reason. It works by having a timer, which is set by software to a predetermined value and counts down to zero. This timer is reset to the predetermined value in response to signals received from the processor, thus the processor is designed to send signals to the watchdog periodically during normal operation. If for some reason the processor hangs, then it no longer sends the signals and thus, once the predetermined time has elapsed the watchdog will reset the processor.

A drawback of this system is that a watchdog will only catch a subset of possible operating system crashes as the system may not be executing correctly but may still be sending the signals to the watchdog.

Further error detecting systems are known in which, for example, if a data access is performed outside of a certain memory range then some kind of restore of the system may be activated.

Debug systems are also known, these are not applicable to monitoring real time processing but are used during development of a system to determine where the system is failing. A debug system can be set to watch a particular memory address, which is suspected to be the address where the system is failing. Thus, in response to a data access to this memory address, debug state can be activated to analyse the state of the processor at this particular point.

SUMMARY OF THE INVENTION

Viewed from one aspect the present invention provides monitoring logic for monitoring a data processor to detect if it is not operating as anticipated, said monitoring logic comprising: detection logic; and control logic; wherein said detection logic is operable to detect a data or instruction access to at least one predetermined address and in response to not detecting said data or instruction access within a predetermined time, said control logic is operable to send a control signal to said data processor, said control signal controlling said data processor to perform a predetermined operation.

The present invention recognises the problem of conventional watchdogs not being able to detect some of the errors that occur during processing and addresses the problem by monitoring particular data or instruction accesses and if these do not occur within a predetermined time controlling the processor to perform a predetermined operation. Thus, rather than relying on the processor to "kick the watchdog" by sending signals periodically, the present invention can select particular data or instruction accesses that during normal operation the processor will perform periodically and if the processor does not perform one of these during a predetermined time period then it can control the processor to perform a particular operation. Thus, the present system is flexible in that different data or instruction accesses can be selected as the points to watch and the data processor can be controlled to perform a predetermined operation, which can be selected if an abnormal condition is detected.

In some embodiments, said monitoring logic is operable to monitor said data processor during real time operation of said data processor without requiring operator input.

Embodiments of the present invention are able to automatically monitor the real time operation of data processors. This makes them particularly useful for monitoring systems that operate in an unattended condition for large amounts of time. It is clearly important with such systems that if there is a problem it is detected and dealt with, otherwise it may be some time later that an operator returns to check the system and notices a problem, by this time a lot of processing time will have been lost.

In some embodiments, said detection logic is operable to detect a data or instruction access to any one of a plurality of addresses, wherein in particular embodiments said plurality of addresses comprise a plurality of adjacent addresses.

Embodiments of the present invention are able to monitor data or instruction accesses to a particular address, or to a number of addresses. In some embodiments a range of addresses, in other words a plurality of adjacent addresses, are monitored. This is particularly advantageous, as instead of needing to store each address to be monitored a range can be stored.

In some embodiments, said monitoring logic comprises a data input and a data store, said data input is operable to receive said at least one predetermined address and said data store is operable to store said at least one predetermined address.

One advantage of embodiments of the present invention is that the predetermined address that is monitored can be input via a data input. This can be advantageous in systems which are being monitored where conditions may change as this allows flexibility in what exactly is monitored.

In some embodiments said data input is operable to receive data specifying said predetermined time and data specifying said predetermined operation as well as receiving said at least one predetermined address.

Further flexibility is attained if the operation and time period can also be entered by a user. In some embodiments of the invention however, these values are input during manufacture and cannot be altered.

In embodiments, said monitoring logic is operable to monitor one of said data buses linking said data processor to a data store, said detection logic being operable to detect said data or instruction access as it passes along said bus.

Generally, the data or instruction accesses are detected by detecting data passing along one of the buses linking the various data stores such as memory and caches to the processing unit.

In embodiments, said monitoring logic further comprises a data input operable to receive an input signal from said data processor, said monitoring logic being operable to control said data processor to perform a further predetermined operation in response to not receiving said input signal within a further predetermined time.

In some embodiments, the monitoring logic can be part of a watchdog type system wherein signals received from the data processor are used to determine if the processor is operating correctly in addition to the data or instruction accesses being monitored.

In some embodiments, said further predetermined operation comprises a data processor reset.

Generally, the system will reset the data processor when it does not receive a signal from the data processor within the predetermined time. This is similar to a traditional watchdog.

In embodiments of the invention said predetermined operation comprises a data processor reset.

In some embodiments on not detecting a data or instruction access within the predetermined time, the monitoring logic acts to reset the data processor. Thus, if the data processor has not accessed the data because it has hung this problem is addressed.

In other embodiments said predetermined operation comprises switching to a predetermined address.

Switching to a predetermined address, where some routine such as a crash handling routine may be stored, can be advantageous in certain circumstances, as then the processor may be able to address the problem and return to normal execution.

In some embodiments, said timer comprises a counter operable to count down from said predetermined time and said detection logic is operable to reset said counter to said predetermined time in response to detection of said data or instruction access.

Although the predetermined time can be measured in a number of ways, it has been found that using a counter which is set to a predetermined value and reset every time the data or instruction access is detected is a convenient way to measure it.

In some embodiments, said data processor comprises an image processing system and said data store comprises a frame buffer, said detection logic being operable to detect a write to said frame buffer, and said control logic being operable to reset said image processing system in response to not detecting a write within said predetermined time.

Embodiments of the present invention have been found to be particularly applicable to image processing systems such as digital set top boxes that process data prior to filling a frame buffer which is then displayed. Such processing systems operate in many cases unattended and if they fail it can be extremely frustrating to discover that a program that was to have been recorded is not present. Embodiments of the invention can detect writes to a frame buffer and if these stop, the monitoring logic has detected a problem with the image processing system and can act to try to overcome the problem.

In some embodiments, said data processor is operable to process data within a secure domain and a non-secure domain and said predetermined operation comprises switching to said secure domain if said data processor is not currently operating within said secure domain.

Embodiments of the invention can be used in data processors that operate in a secure and non-secure domain. They can be used to detect data or instruction accesses which if they were to be interrupted for a predetermined time may indicate that the security of the system has been compromised. Thus, in response to not detecting a data or instruction access for a predetermined time, embodiments of the invention can switch the apparatus to the secure domain and thereby stop any unauthorised access of data.

In embodiments of the invention, said timer is operable to measure at least one further predetermined time; and said detection logic is operable to detect at least one further data or instruction access to at least one further at least one predetermined address and in response to not detecting said at least one further data or instruction access within said at least one further predetermined time, said control logic is operable to send a control signal to said data processor, said control signal controlling said data processor to perform at least one further predetermined operation.

Embodiments of the invention can study different data or instruction accesses and allow them different times within which they should be performed, in effect the system provides more than one watchpoint. The data processor can be controlled to perform either the same operation or a different operation in response to each watchpoint that does not have a data or instruction access within its own predetermined time.

A second aspect of the present invention provides a data processing apparatus comprising a data processor and monitoring logic according to a first aspect of the present invention, said monitoring logic being operable to monitor said data processor.

Although the monitoring logic can be a separate device to the processor that it is monitoring in some embodiments they are contained within a single data processing apparatus.

A third aspect of the present invention provides a method of monitoring a data processor to detect if it is not operating as anticipated, said method comprising the steps of: (i) starting the measurement of a predetermined time; (ii) monitoring a data or instruction access to at least one predetermined address; and either (iii) detecting a data or instruction access and returning to step (i); or (iii) in response to not having detected said data or instruction access within said predetermined time controlling said data processor to perform a predetermined operation.

A fourth aspect of the present invention provides monitoring means for monitoring a data processor to detect if it is not operating as anticipated, said monitoring means comprising: timing means for measuring a predetermined time; detection means for detecting a data or instruction access to at least one predetermined address; and control means for controlling said data processor to perform a predetermined operation; wherein said control means is operable in response to said detection means not detecting said data or instruction access within said predetermined time to send a control signal to said data processor, said control signal controlling said data processor to perform said predetermined operation.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
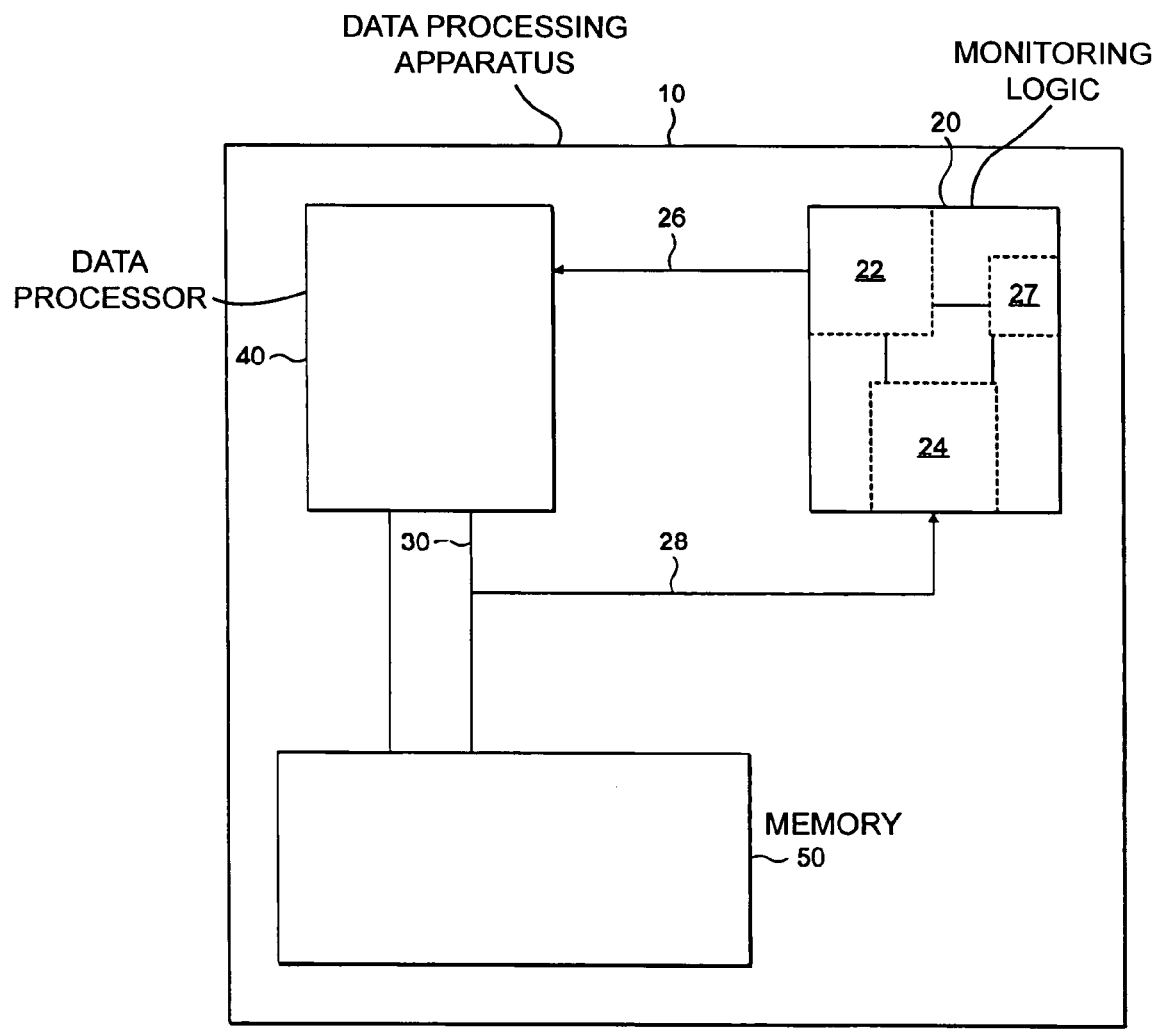
FIG. 1 schematically illustrates a data processing apparatus according to an embodiment of the present invention.

FIG. 1 schematically shows a data processing apparatus according to an embodiment of the present invention. The data processing apparatus 10 comprises monitoring logic 20 according to an embodiment of the present invention. Data processing apparatus also comprises a data processor 40 and memory 50, the two being linked by a data bus 30. Although the data processor 40 and memory 50 are shown as single blocks with the data bus 30 being a single bus, clearly this is a very simplified schematic diagram and memory 50 may comprise several different memory units linked by different buses. For example memory 50 may comprise a cache and a memory or a plurality of caches and different memory units. Monitoring logic 20 is operable to monitor data bus 30 to detect a particular data access travelling along this bus. Monitoring logic 20 comprises detection logic 24, a counter 27 and control logic 22. Detection logic 24 interprets data accesses occurring on data bus 30 and signals indicating that a data access has occurred are sent along data interconnection 28 to the detection logic 24. In response to the signals being detected detection logic resets the value of counter 27 to a predetermined value. Counter 27 then starts counting down again. If no signal is received from detection logic 24 by counter 27 within the predetermined time then counter 27 reaches a zero value and it sends a signal to control logic 22 to this effect. Control logic 22 then sends a signal via data interconnection 26 to the processing unit 40 and controls it to perform a particular operation. This in many embodiments is a reset.

Figure 2:
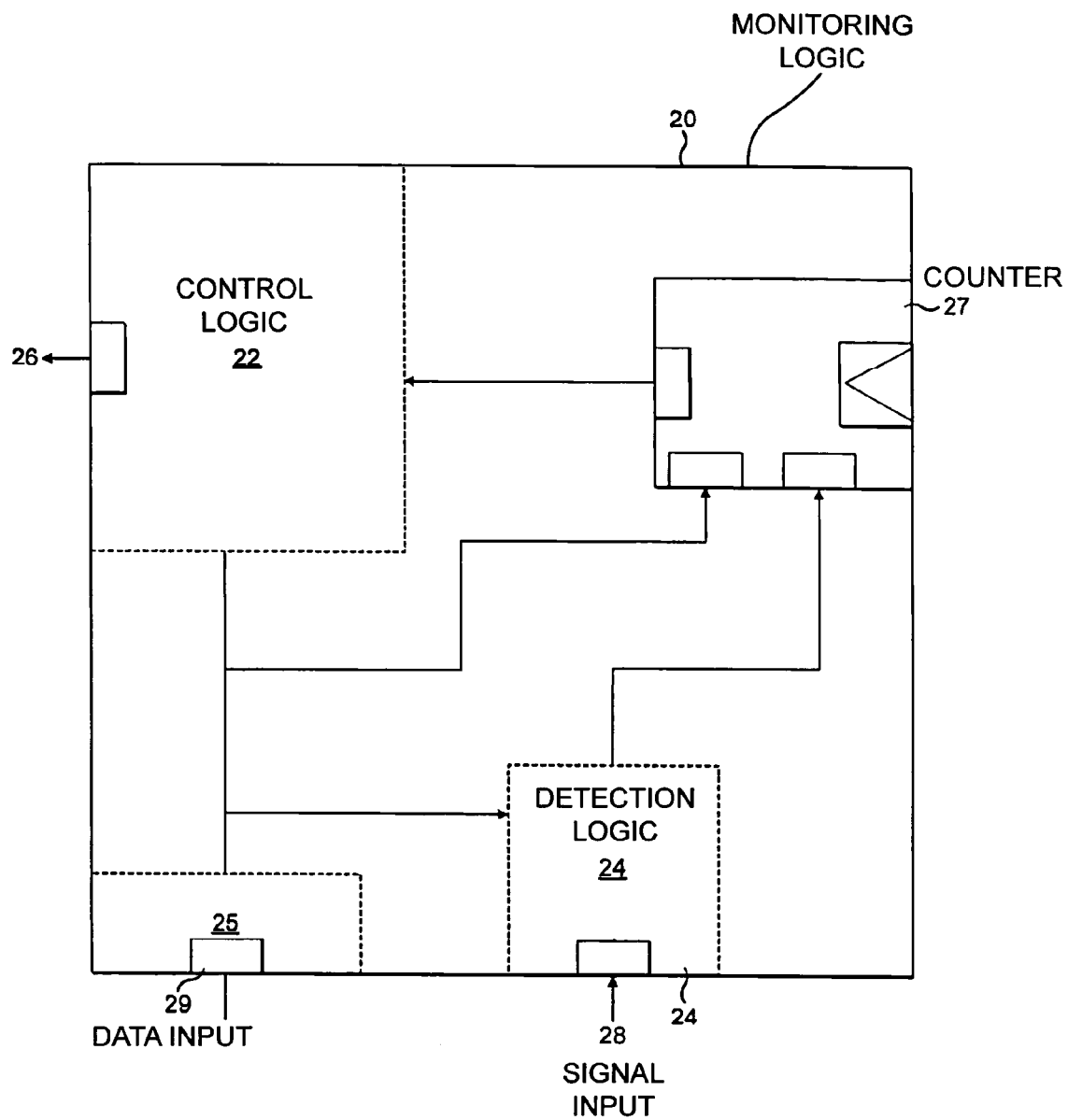
FIG. 2 shows monitoring logic of the data processing apparatus of FIG. 1.

FIG. 2 shows monitoring logic 20 in more detail. As can been seen from FIG. 2 there is detection logic 24 which has an input for receiving a signal 28 indicating that a data access to a predetermined address has been received. Monitoring logic 20 also comprises a data input 29, which is operable to receive signals to configure the monitoring logic 20. Thus, data values can be input here to set such things as the predetermined time that the counter 27 should count down to, the predetermined addresses at which the data accesses are being monitored, the nature of the data access (e.g. a read or a write). The data values input here are stored in a data store 25 and are accessed by the monitoring logic, the control logic and the counter.

Counter 27 receives the predetermined time from data store 25 and counts down from this value. It also receives signals from detection logic 24 which cause it to reset its value to the predetermined time. It outputs a signal to control logic 22 when it counts down to zero. Control logic 22 in response to this signal outputs a predetermined control signal to the processor. This predetermined control signal is stored in data store 25 and has been input by a data value input 29. In some embodiments, this information is stored in the monitoring logic during manufacture and cannot be input via an input and thus the system would not be configurable.

Although in this embodiment, the counter is set to a predetermined value and counts down it would be clear to a skilled person that this does not have to happen and in fact it could count up to a predetermined value or could count between two predetermined values.

Figure 3:
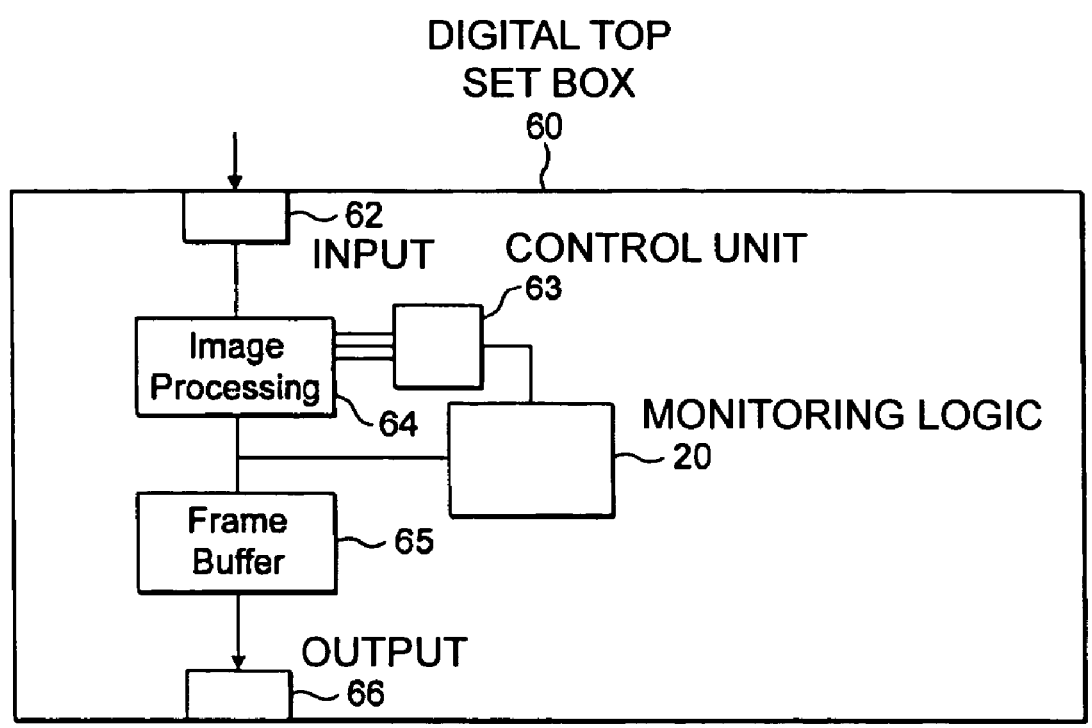
FIG. 3 shows a digital set top box with monitoring logic according to an embodiment of the present invention.

FIG. 3 shows a digital set top box 60 having monitoring logic according to an embodiment of the present invention. The digital set top box 60 comprises an input 62 operable to receive a transmitted broadcast, a control unit 63, an image processing unit 64 and a frame buffer 65. It also comprises an output 66 operable to output the images to be displayed on a television set from the frame buffer 65. Monitoring logic 20 according to an embodiment of the present invention monitors the writing of the image processing unit to the frame buffer and outputs a signal to the control unit 63.

In operation set top box 60 receives a transmittable broadcast at 62 and the image processing unit 64 processes this image data under control of control unit 63 and outputs the processed frames ready to be displayed to frame buffer 65. Frame buffer 65 then outputs the frames to output 66. During normal operation the image processing unit 64 writes to frame buffer 65 at regular intervals. Thus, in order to detect that the processing is operating as expected monitoring logic monitors that data is written to the frame buffer within a predetermined time, the predetermined time being set within the monitoring logic 20. If a data write is not detected during the predetermined time then this is indicated to control unit 63. Control unit 63 can then assess the state of the image processing unit and can either reset it or set it to jump to a handling routine to try to resolve the problem.

Thus, it may be that the problem can be quickly resolved and the frame buffer written to again before it is empty and thus the displayed data is not interrupted. Alternatively, it may be that an interrupt in data is required for a period of time but then data can be displayed again. In any case it is preferable to do either of these than have the system hanging and this not being detected during perhaps the recording of a whole program.

In this embodiment, the monitoring logic is contained within the set top box 60 and is not configurable. That is to say that the monitoring logic is pre-configured to monitor data writes to the frame buffer during a predetermined time which is not alterable and when no writes are detected within this time a predetermined control signal is sent to control unit 63.

Figure 4:
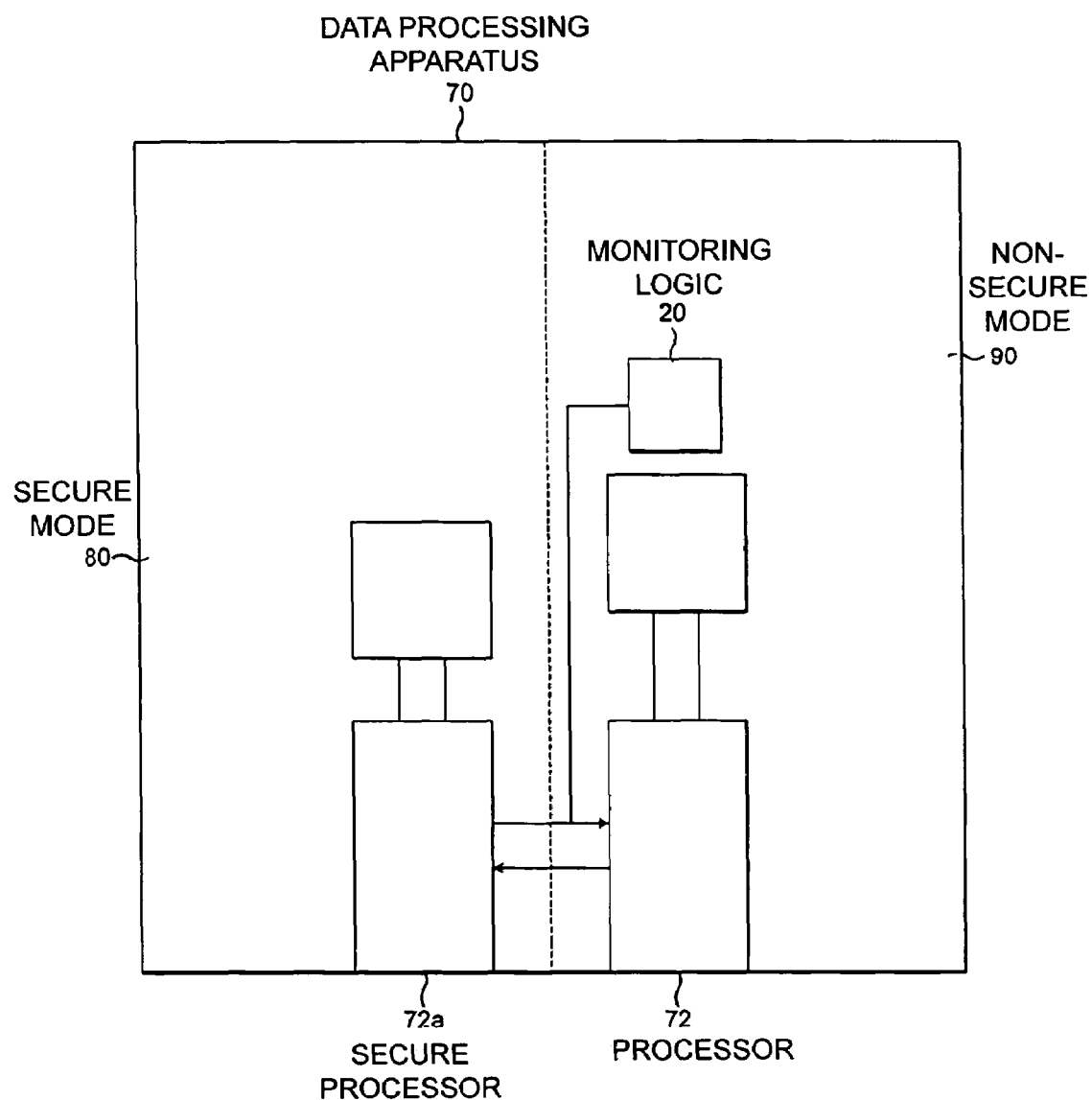
FIG. 4 schematically shows a data processing apparatus operable in secure and non-secure mode.

FIG. 4 schematically shows a data processing apparatus 70 operable in secure mode 80 and non-secure mode 90 according to an embodiment of the present invention. In this embodiment monitoring logic 20 monitors data accesses between secure domain 80 and non-secure domain 90. If the secure domain is not accessed for a predetermined interval of time, then it would seem that there may be a problem and the system should be switched to secure mode. Thus, the monitoring logic is set to monitor that secure data accesses are made at regular intervals and if they are not a control signal is sent to the processor 72 to switch to secure processing 72a.

Figure 5:
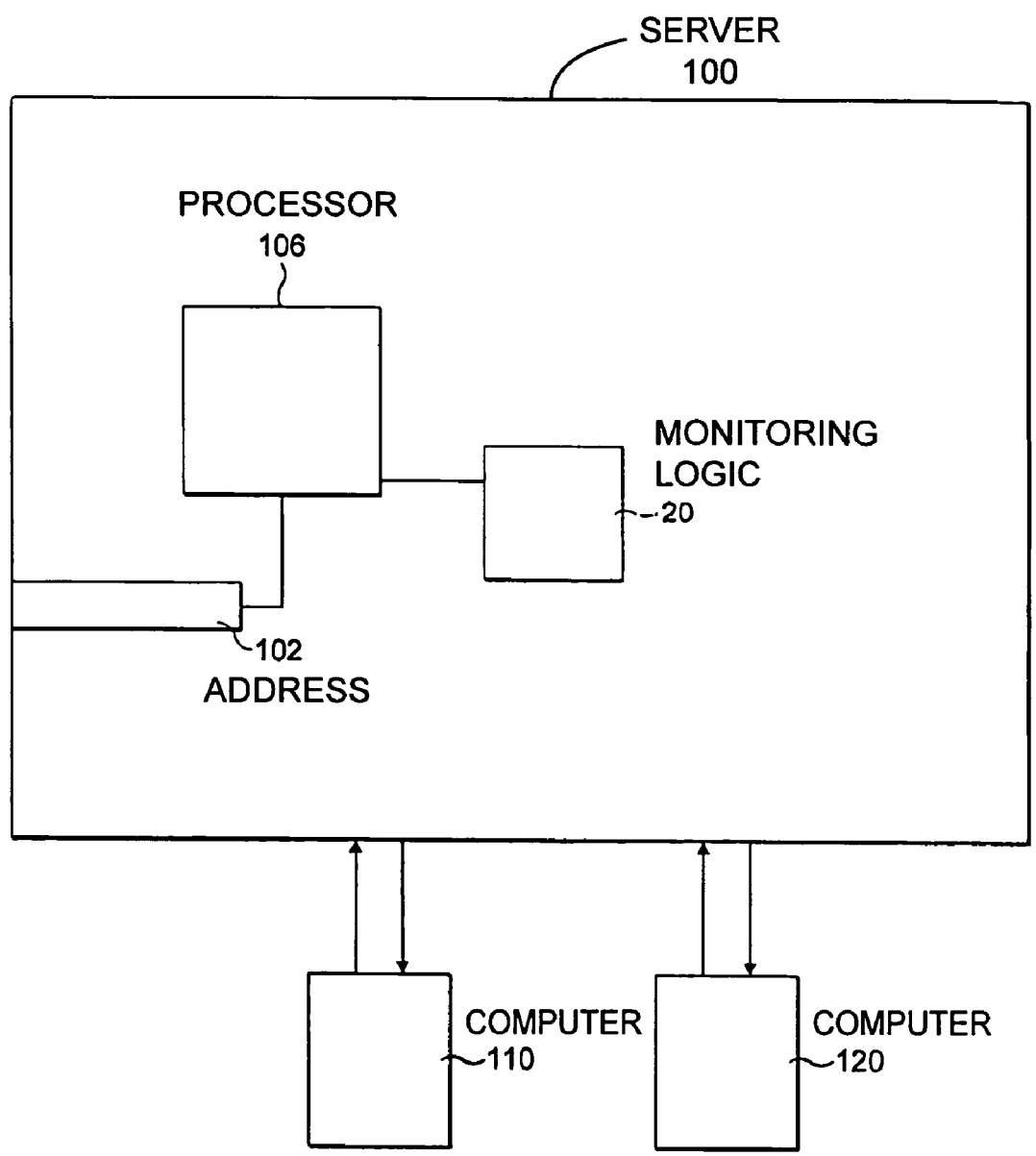
FIG. 5 shows a server having monitoring logic according to an embodiment of the present invention.

FIG. 5 shows a server 100 comprising processor 106. Server 100 receives a plurality of signals from a number of individual computers 110 and sends signals back to these computers. It also receives a plurality of signals from a further set of computers 120 and returns signals to them.

Monitoring logic 20 can be operable to set watchpoints to monitor data or instruction accesses to particular addresses. In response to one of the watchpoints indicating that it has not received a data or instruction access within its predetermined time, monitoring logic is operable to send a control signal to the processor indicating to it to switch to address 102 storing a crash handling routine. After the server switches to the handling routine, it monitors the addresses at the data or instruction accesses which have not occurred within the predetermined time and detects which process is not operating as anticipated. Thus, if one particular process is taking up a lot of CPU time and is not accessing data or instructions regularly it would seem that this process is the process causing the problem and thus the handler routine can act to terminate this process. Thus, if for example such a problem were to occur during the night, the monitoring logic can prevent the server's performance from deteriorating by terminating the process that is not operating as it should do and the server can continue to process the other data.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Monitoring logic for monitoring a data processor to detect if it is not operating as anticipated, said monitoring logic comprising:

a timer for measuring a predetermined time;
detection logic for detecting a data or instruction access to at least one predetermined address; and
control logic, responsive to said detection logic not detecting said data or instruction access within said predetermined time, configured for sending a control signal to said data processor, said control signal controlling said data processor to perform a predetermined operation, wherein said predetermined operation comprises switching to a predetermined address for storing a crash handling routine for addressing a problem without resetting said data processor.

2. Monitoring logic according to claim 1, said monitoring logic being configured to monitor said data processor during real time operation of said data processor without requiring operator input.

3. Monitoring logic according to claim 1, wherein said detection logic is configured to detect a data or instruction access to any one of a plurality of addresses.

4. Monitoring logic according to claim 3, wherein said plurality of addresses comprise a plurality of adjacent addresses.

5. Monitoring logic according to claim 1, said monitoring logic comprising a data input and a data store, said data input configured to receive said at least one predetermined address and said data store configured to store said at least one predetermined address.

6. Monitoring logic according to claim 5, wherein said data input is configured to receive data specifying said predetermined time and data specifying said predetermined operation.

7. Monitoring logic according to claim 1, wherein said monitoring logic is configured to monitor one of a data bus linking said data processor to a data store, said detection logic for detecting said data and instruction access as it passes along said bus.

8. Monitoring logic according to claim 7, wherein said data processor comprises an image processing system and said data store comprises a frame buffer, said detection logic configured to detect a write to said frame buffer, and said control logic configured to reset said image processing system in response to not detecting a write within said predetermined time.

9. Monitoring logic according to claim 1, wherein said monitoring logic further comprises a data input configured to receive an input signal from said data processor, said monitoring logic configured to control said data processor to perform a further predetermined operation in response to not receiving said input signal within a further predetermined time.

10. Monitoring logic according to claim 9, wherein said further predetermined operation comprises a data processor reset.

11. Monitoring logic according to claim 1 wherein said timer comprises a counter configured to count down from said predetermined time and said detection logic is configured to reset said counter to said predetermined time in response to detection of said data or instruction access.

12. Monitoring logic according to claim 1, wherein said data processor is configured to process data within a secure domain and a non-secure domain and said predetermined operation comprises switching to said predetermined address within said secure domain if said data processor is not currently operating within said secure domain.

13. Monitoring logic according to claim 1, wherein
said timer is configured to measure at least one further predetermined time; and
said detection logic is configured to detect at least one further data or instruction access to at least one further at least one predetermined address and in response to not detecting said at least one further data or instruction access within said at least one further predetermined time, said control logic is configured to send a control signal to said data processor, said control signal controlling said data processor to perform at least one further different predetermined operation.

14. A data processing apparatus comprising a data processor and monitoring logic according to claim 1, said monitoring logic configured to monitor said data processor.

15. A method of monitoring a data processor to detect if it is not operating as anticipated, said method comprising the steps of:
(i) starting the measurement of a predetermined time;
(ii) monitoring a data or instruction access to at least one predetermined address; and either
(iii) detecting a data or instruction access and returning to step (i); or
(iii) in response to not having detected said data or instruction access within said predetermined time, controlling said data processor to perform a predetermined operation, wherein said predetermined operation comprises switching to a predetermined address for storing a crash handling routine for addressing a problem without resetting said data processor.

16. Monitoring means for monitoring a data processor to detect if it is not operating as anticipated, said monitoring means comprising:
timing means for measuring a predetermined time;
detection means for detecting a data or instruction access to at least one predetermined address; and
control means for controlling said data processor to perform a predetermined operation; wherein
said control means, is responsive to said detection means not detecting said data or instruction access within said predetermined time, for sending a control signal to said data processor, said control signal controlling said data processor to perform said predetermined operation, wherein said predetermined operation comprises switching to a predetermined address for storing a crash handling routine for addressing a problem without resetting said data processor.

* * * * *